(12) United States Patent
Hong et al.

(10) Patent No.: US 9,796,427 B2
(45) Date of Patent: Oct. 24, 2017

(54) UNDERBODY STRUCTURE FOR VEHICLE

(71) Applicants: Hyundai Motor Company, Seoul (KR); Kia Motors Corporation, Seoul (KR)

(72) Inventors: Deok Hwa Hong, Gyeonggi-do (KR); Hee Seouk Chung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 55 days.

(21) Appl. No.: 14/943,665

(22) Filed: Nov. 17, 2015

(65) Prior Publication Data

US 2017/0057559 A1 Mar. 2, 2017

(51) Int. Cl.
| | |
|---|---|
| *B62D 29/00* | (2006.01) |
| *B62D 21/15* | (2006.01) |
| *B62D 25/08* | (2006.01) |
| *B62D 21/03* | (2006.01) |
| *B62D 27/02* | (2006.01) |

(52) U.S. Cl.
CPC ........... *B62D 29/008* (2013.01); *B62D 21/03* (2013.01); *B62D 21/152* (2013.01); *B62D 25/08* (2013.01); *B62D 21/155* (2013.01); *B62D 27/02* (2013.01)

(58) Field of Classification Search
CPC .... B62D 29/008; B62D 21/03; B62D 21/155; B62D 21/02
USPC .................. 296/187.03, 187.09, 193.09, 204
See application file for complete search history.

(56) References Cited

U.S. PATENT DOCUMENTS

| 8,672,393 | B2* | 3/2014 | Tomozawa | B62D 21/155 |
| | | | | 296/187.09 |
| 2003/0090127 | A1* | 5/2003 | Saeki | B62D 21/152 |
| | | | | 296/187.12 |
| 2004/0200659 | A1* | 10/2004 | Miyasaka | B62D 21/155 |
| | | | | 180/312 |
| 2013/0214558 | A1* | 8/2013 | Lohmann | B62D 25/025 |
| | | | | 296/187.08 |
| 2013/0334840 | A1* | 12/2013 | Iseki | B62D 21/11 |
| | | | | 296/193.09 |

(Continued)

FOREIGN PATENT DOCUMENTS

| JP | 2005-119488 A | 5/2005 |
| JP | 2005-162005 A | 6/2005 |

(Continued)

*Primary Examiner* — Jason S Morrow
(74) *Attorney, Agent, or Firm* — Mintz Levin Cohn Ferris Glovsky and Popeo, P.C.; Peter F. Corless

(57) ABSTRACT

An underbody structure for a vehicle is provided. In particular, the underbody structure includes a front side member. The front side member includes a cooling module section being a foremost portion and that corresponds to a position of a cooling module in front of the vehicle, a front absorption section that extends toward a rear of the cooling module section and a power train section that extends toward a rear of the front absorption section and corresponds to a position at which an engine and a transmission are positioned. Further, a subframe mounting section extends toward a rear of the power train section and corresponds to a position at which a subframe is positioned. Additionally, each section of the front side member has different thicknesses.

8 Claims, 3 Drawing Sheets

(56) References Cited

U.S. PATENT DOCUMENTS

| | | | | |
|---|---|---|---|---|
| 2014/0159430 A1* | 6/2014 | Mildner | ................. | B62D 25/04 |
| | | | | 296/193.09 |
| 2015/0091327 A1* | 4/2015 | Kim | ......................... | B21B 1/12 |
| | | | | 296/187.03 |
| 2016/0046328 A1* | 2/2016 | Steffens | ................. | B21D 47/01 |
| | | | | 296/193.06 |
| 2016/0059892 A1* | 3/2016 | Lee | ..................... | B62D 21/152 |
| | | | | 296/187.09 |
| 2016/0129941 A1* | 5/2016 | Kim | ..................... | B60R 19/023 |
| | | | | 296/187.09 |

FOREIGN PATENT DOCUMENTS

| | | |
|---|---|---|
| JP | 2009-006903 A | 1/2009 |
| JP | 2010-228610 A | 10/2010 |
| KR | 10-1998-0036174 A | 6/1998 |
| KR | 10-0288636 B1 | 2/2001 |
| KR | 10-2002-0007641 A | 1/2002 |
| KR | 10-2011-0023600 A | 3/2011 |

\* cited by examiner

UNDERBODY STRUCTURE FOR VEHICLE

CROSS REFERENCE TO RELATED APPLICATION

The present application claims priority to Korean Patent Application No. 10-2015-0121780, filed on Aug. 28, 2015, the entire contents of which is incorporated herein for all purposes by this reference.

BACKGROUND

1. Technical Field

The present invention relates to an underbody structure for a vehicle, and more particularly, to improving passenger safety by maintaining an interior space of the vehicle while absorbing shock upon a vehicle collision.

2. Description of the Related Art

Recently, a design technology of an underbody structure for a vehicle has been developed to improve passenger safety by preventing shock from a vehicle collision from being delivered into the interior (e.g., passenger compartment) of the vehicle while absorbing shock from the vehicle collision. In particular, to absorb the shock delivered into the vehicle upon the vehicle collision, a portion of the underbody structure for a vehicle is configured to be crushed in an accordion shape to absorb shock delivered into the vehicle. Therefore a portion of the underbody structure bends to absorb the shock, and secures a space to prevent the interior space of the vehicle from being compromised to ensure passenger safety. However, absorbing the shock and securing the interior space of the vehicle conflict with each other. Therefore, the technology required for compatibility between the functions of shock absorption and securing interior space of the vehicle must be balanced.

In other words, when the underbody structure for a vehicle is designed to have high strength, the function of absorbing shock may deteriorate. When the underbody structure for a vehicle is designed to have low strength, the shock may be absorbed but the interior space of the vehicle may not be structurally maintained and the passenger safety may not be ensured.

The above information disclosed in this section are intendent merely for assisting in the understanding for the background of the present invention and therefore may contain information that does not form the prior art that is known to those skilled in the art.

SUMMARY

The present invention provides an underbody structure for a vehicle capable of reducing the weight of the vehicle by removing reinforcing components and by manufacturing the components to have different thicknesses for each section within one component to distribute strength to be suited for purposes of each section.

In one aspect, according to an exemplary embodiment of the present invention, an underbody structure for a vehicle may include: a front side member, wherein the front side member includes a cooling module section having a foremost portion that corresponds to a position of a cooling module in front of the vehicle, a front absorption section that extends toward a rear of the cooling module section, and a power train section that extends toward a rear of the front absorption section and corresponds to a position of an engine and a transmission. Further, a subframe mounting section may extend toward a rear of the power train section and corresponds to a position of a subframe, and each section of the front side member may have different thicknesses.

The underbody structure for a vehicle may further include a rear lower member coupled to a rear end of the front side member. The rear lower member may include a subframe mounting section that corresponds to a position of the subframe and a pedal mounting section that extends within the subframe mounting section and corresponds to a position of a pedal and a rear preservation section that extends toward a rear of the pedal mounting section. Additionally, a sheet mounting section may extend toward a rear of the rear preservation section and corresponds to a position of a front seat sheet, and each section of the rear lower member may have different thicknesses.

The underbody structure for a vehicle may further include a center upper member. The center upper member may include a pedal mounting section that corresponds to a position of a pedal, a rear preservation section that extends toward a rear of the pedal mounting section and a sheet mounting section that extends toward a rear of the rear preservation section and corresponds to a position of a front seat sheet. Further, each section of the center upper member may have different thicknesses.

The underbody structure for a vehicle may further include a side sill. The side sill may include a rear preservation section that extends toward a rear of the pedal mounting section and a sheet mounting section that extends toward a rear of the rear preservation section and corresponds to a position of a front seat sheet. Further, each section of the side sill may be configured to have different thicknesses.

The thickness of the cooling module section may be a first thickness T1, the thickness of the front absorption section may be a second thickness T2, the thickness of the power train section may be a third thickness T3, and the thickness of the subframe mounting section may be a fourth thickness T4. Further, a correlation between the thicknesses for each section may include the third thickness may be greater than the second thickness, the second thickness may be greater than the first thickness and the first thickness may be greater than the fourth thickness T3>T2>T1>T4.

The thickness of the subframe mounting section may be a fourth thickness T4, the thickness of the pedal mounting section may be a fifth thickness T5, the thickness of the rear reservation section may be a sixth thickness T6, and the thickness of the sheet mounting section 17 may be a seventh thickness. Further, a correlation between the thicknesses for each section may include the fifth thickness that may be greater than the fourth thickness, the fourth thickness may be greater than a sixth thickness and the sixth thickness may be greater than the seventh thickness (T5>T4>T6>T7). The thickness of the pedal mounting section may be a fifth thickness, the thickness of the rear reservation section may be a sixth thickness, and the thickness of the sheet mounting section may be a seventh thickness T7. In particular, a correlation between the thicknesses for each section may be the fifth thickness is greater than the sixth thickness, and the sixth thickness is greater than the seventh thickness (T5>T6>T7). The thickness of the rear preservation section may be a sixth thickness and the thickness of the sheet mounting section may be a seventh thickness, and a correlation between the thicknesses for each section may be the sixth thickness may be greater than the seventh thickness (T6>T7). The thicknesses for each section may be differently manufactured for each section by a tailor rolled blanks (TRB) method.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Figure 1:
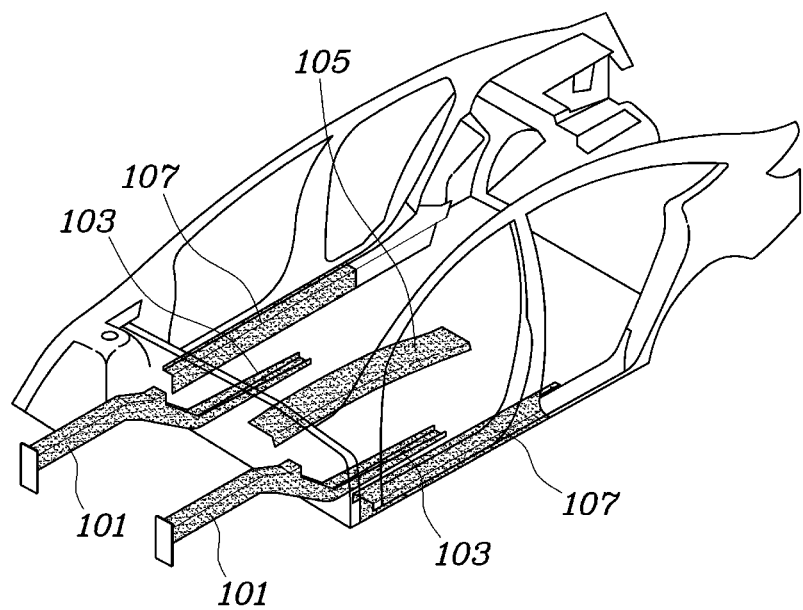
FIG. 1 is an exemplary diagram of an underbody structure for a vehicle according to an exemplary embodiment of the present invention.
Figure 2:
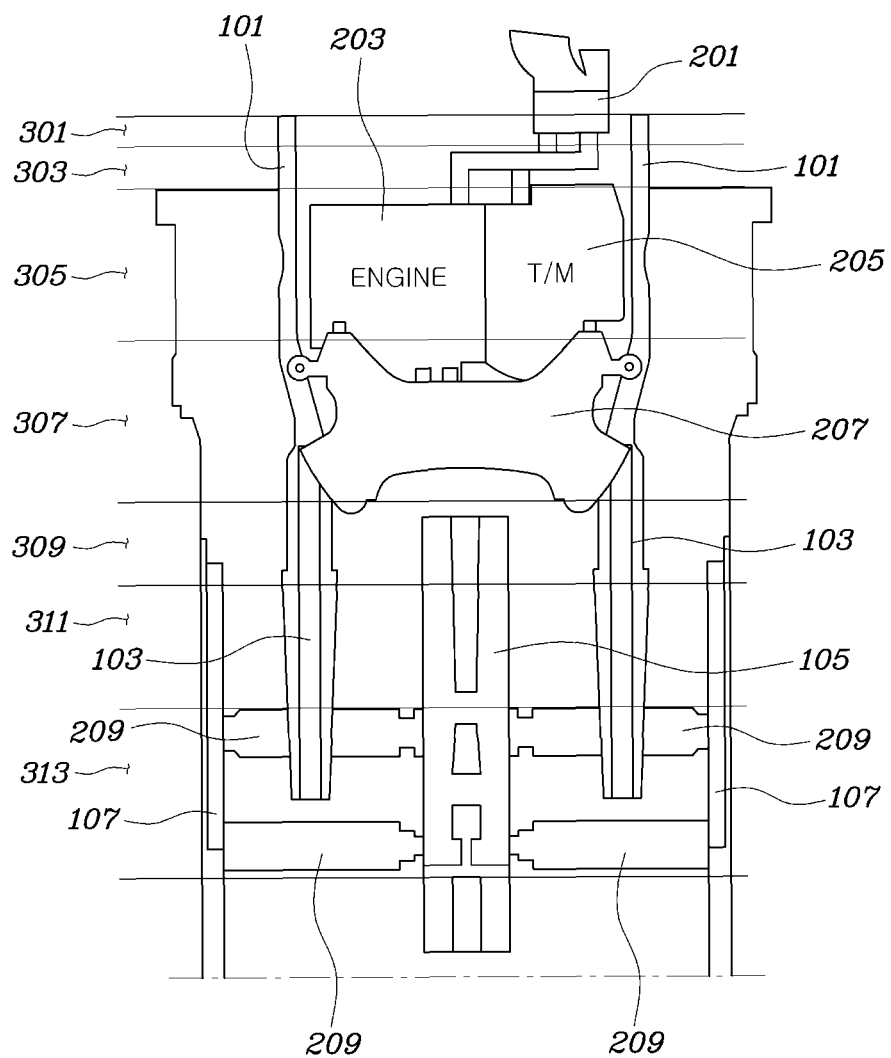
FIG. 2 is an exemplary view of a section disposition of the underbody structure for a vehicle according to the exemplary embodiment of the present invention.
Figure 3:
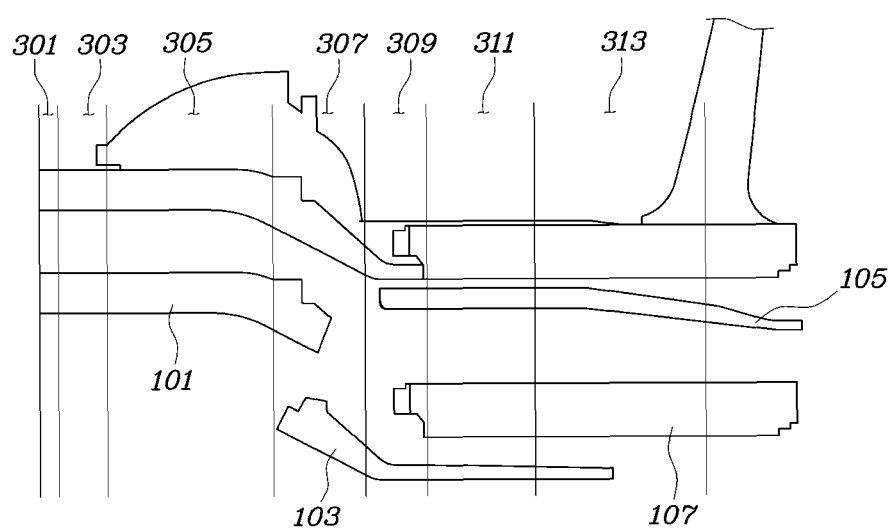
FIG. 3 is an exemplary side view of the section disposition of the underbody structure for a vehicle according to the exemplary embodiment of the present invention.

FIG. 1 is an exemplary diagram of an underbody structure for a vehicle according to an exemplary embodiment of the present invention. FIG. 2 is an exemplary plan view of a section disposition of the underbody structure for a vehicle according to the exemplary embodiment of the present invention. FIG. 3 is an exemplary side view of the section disposition of the underbody structure for a vehicle according to the exemplary embodiment of the present invention.

Referring to FIGS. 2 and 3, the underbody structure for a vehicle according to an exemplary embodiment of the present invention may include a front side member 101. The front side member 101 may include a cooling module section 301 being a foremost portion and may correspond to a position of a cooling module 201 in front of the vehicle. A front absorption section 303 may extend toward a rear of the cooling module section 301 and a power train section 305 may extend toward a rear of the front absorption section 303 and may correspond to a position of an engine 203 and a transmission 205. Further, a subframe mounting section 307 may extend toward a rear of the power train section 305 and may correspond to a position of a subframe 207. Additionally, each section of the front side member 101 may have different thicknesses.

The underbody structure for a vehicle may include a rear lower member 103 coupled to a rear end of the front side member 101. The rear lower member 103 may include a subframe mounting section 307 that corresponds to a position of the subframe 207, a pedal mounting section 309 that extends in the subframe mounting section 307 and corresponds to a position of a pedal and a rear preservation section 311 that extends toward a rear of the pedal mounting section 309. Further, a sheet mounting section 313 may extend toward a rear of the rear preservation section 311 and correspond to a position 209 of a front seat sheet. Additionally, each section of the rear lower member 103 may have different thicknesses.

The underbody structure for a vehicle may further include a center upper member 105. In particular, the center upper member 105 may include a pedal mounting section 309 that corresponds to a position of the pedal, a rear preservation section 311 that extends toward a rear of the pedal mounting section 309; and a sheet mounting section 313 that extends toward a rear of the rear preservation section 311 and corresponds to the position 209 of a front seat sheet. Further, each section of the center upper member 105 may have different thicknesses The underbody structure for a vehicle may include a side sill 107. The side sill 107 may include a rear preservation section 311 that extends toward a rear of the pedal mounting section 309 and a sheet mounting section 313 that extends toward a rear of the rear preservation section 311 and corresponds to the position 209 of the front seat sheet. Further, each section of the side sill 107 may have different thicknesses.

Referring to FIG. 1, the underbody structure for a vehicle may include the front side member 101, the rear lower member 103, the side sill 107, the center upper member 105, etc. The underbody structure may absorb shock that occurs upon the vehicle collision to minimize the delivery of the shock to a passenger compartment, thereby protecting the passengers. When the underbody structure is made of a high strength material to prevent a vehicle body from being deformed, the underbody structure may maintain the integrity of the space of the passenger compartment but may not absorb shock energy and may deliver the absorbed shock energy to passengers. Accordingly, the passengers may suffer injury. Conversely, even though the vehicle body may be deformed to adequately absorb the energy upon impact during the vehicle collision, when the space of the passenger is not secured, the passengers may also suffer injury. In particular, the deformation of the vehicle body and the preservation of the space within the passenger compartment should be reconciled.

A method for absorbing or delivering, by the underbody, shock energy to protect passengers may include a plurality of solutions. In an exemplary embodiment, the method for absorbing and delivering shock energy may include absorbing energy by compressing and deforming a member configuring the underbody upon the vehicle collision. In an alternate exemplary embodiment, the method for absorbing and delivering shock energy may include absorbing energy by a bending deformation in conjunction with a deformation of a rigid body when a surrounding rigid body may encounter resistance upon compression and deformation of a member. In another alternate exemplary embodiment, the method for absorbing and delivering shock energy may include protecting passengers by preserving a portion of a passenger compartment in which lower components of passengers, a pedal, etc., exist.

the rear of the pedal mounting section 309 and may preserve the space that protects the passengers. The sheet mounting section 313 may include a section that corresponds to the position where the front seat sheet may be positioned and may preserve the space (e.g., passenger compartment) for protecting passengers.

Each component of the underbody structure for a vehicle based on the defined section as described above may be divided into the corresponding sections based on the position of the components and may be configured to have different thickness based on each divided section. The correlation of the role and the thickness for each section is shown in the following Table 1.

TABLE 1

| | Section name | | | | | | |
|---|---|---|---|---|---|---|---|
| | Cooling module section | Front absorption section | Power train section | Subframe mounting section | Pedal mounting section | Rear preservation section | Sheet mounting section |
| Role | Compression deformation | Compression deformation | Bending deformation | Space preservation | Space preservation | Space preservation | Space preservation |
| Thickness | T1 | T2 | T3 | T4 | T5 | T6 | T7 |
| Thickness Correlation | | | $T5 \geq T3 \geq T2 \geq T1 \geq T4 \geq T6 \geq T7$ | | | | |

Therefore, the thickness and the rigidity required may vary based on whether energy may be absorbed evenly by the deformation or whether the space of the passenger compartment may be secured. The related art uses a method for adding a reinforcing member to a portion where strength reinforcement is required for each component. However, the method may increase assembling costs due to the addition of the reinforcing member and may have an insignificant improvement effect of strength by bonding the reinforcing member to a main member by welding.

In the underbody structure for a vehicle according to the exemplary embodiment, sections may be selected based on a role and degree of contribution upon the vehicle collision. For example, the thickness of the same component may be machined differently to save a weight and production costs while maximizing the absorption of shock power and the protection performance of passengers upon the vehicle collision.

Referring to FIGS. 2 and 3, the cooling module section 301 may include a section that corresponds to the position of the cooling module 201 of the foremost of the vehicle body and absorbs the shock power by the compression deformation. The front absorption section 303 may include a section that extends toward the rear of the cooling module section 301 and absorbs the shock power by the compression deformation. The power train section 305 may include a section that corresponds to the position at which the engine 203 and the transmission 205 are positioned and may absorb the shock power by the bending deformation. The subframe mounting section 307 may include a section that corresponds to the position of the subframe 208 and preserves the space (e.g., passenger compartment) upon the vehicle collision.

The pedal mounting section 309 may include a section that corresponds to the position at which an accelerator pedal, a brake pedal, etc., are positioned and may preserve a space (e.g., within the passenger compartment) to protect passengers' feet (e.g., limbs, appendages). The rear preservation section 311 may include a section that extends toward When the thickness of the cooling module section 301 of the front side member 101 is a first thickness (e.g., T1), the thickness of the front absorption section 303 may be a second thickness (e.g., T2), the thickness of the power train section 305 may be a third thickness (e.g., T3), and the thickness of the subframe mounting section 307 may be a fourth thickness (e.g., T4). The correlation between the thicknesses of each section may be that the third thickness is greater than the second thickness, the second thickness is greater than the first thickness and the first thickness is greater than the fourth thickness (e.g., T3>T2>T1>T4). In some exemplary embodiments, the thickness of the subframe mounting section 307 of the rear lower member 103 may be a fourth thickness (e.g., T4), the thickness of the pedal mounting section 309 may be a fifth thickness (e.g., T5), the thickness of the rear preservation section 311 may be a sixth thickness (e.g., T6), and the thickness of the sheet mounting section 313 may be a seventh thickness (e.g., T7). The correlation between the thicknesses for each section may be that the fifth thickness is greater than the fourth thickness, the fourth thickness is greater than the sixth thickness and the sixth thickness is greater than the seventh thickness (e.g., T5>T4>T6>T7).

The thickness of the pedal mounting section 309 of the center upper member 105 may be a fifth thickness (e.g., T5), the thickness of the rear preservation section 311 may be a sixth thickness (e.g., T6), and the thickness of the sheet mounting section 313 may be a seventh thickness (e.g., T7). The correlation between the thicknesses for each section may be that the fifth thickness is greater than the sixth thickness and the sixth thickness is greater than the seventh thickness (e.g., T5>T6>T7). Further, thickness of the rear preservation section 311 of the side sill 107 may be a sixth thickness (e.g., T6) and the thickness of the sheet mounting section 313 may be a seventh thickness (e.g., T7), the correlation between the thicknesses for each section may be the sixth thickness may be greater than the seventh thickness (e.g., T6>T7).

The thicknesses of each section may be manufactured differently by a tailor rolled blanks (TRB) method. Each component of the underbody structure for a vehicle based on the section defined as described above may be divided into the corresponding sections based on the mounted position. Each divided section may have different thicknesses, thereby saving the weight and the production costs while maximizing the absorption of shock power and the protection performance of the passenger compartment upon the vehicle collision. Results obtained by comparing the detailed numerical values are as follows.

TABLE 2

| | | Existing structure | |
|---|---|---|---|
| No. | Component name | Thickness (mm) | Weight (Kg) |
| 1 | Front side member | 2.0/2.3 | 7.9 |
| 2 | Rear lower member | 1.6 | 6.1 |
| 3 | Front reinforce | 1.0 | 0.9 |
| 4 | Rear reinforce | 1.2 | 1.5 |
| 5 | Outer reinforce | 1.8 | 0.3 |
| 6 | Rear lower reinforce | 1.8 | 2.1 |
| 7 | Rear upper reinforce | 1.8 | 0.5 |
| | Total | | 19.3 kg |
| | The inventive structure | | |
| | Thickness (mm) | Weight (Kg) | Remarks |
| | 2.45/2.6/2.45/2.3 | 9.4 | Apply TRB |
| | (1.6/2.0)/2.2/1.6/1.1 | 6.8 | Apply TRB |
| | | | Deletion |
| | | | Deletion |
| | | | Deletion |
| | | | Deletion |
| | | | Deletion |
| | Total | 16.2 Kg | |

As shown in the above Table, the underbody structure for a vehicle according to the exemplary embodiment of the present invention may be manufactured by variously configuring the thicknesses of components for each section. Therefore, the required strength of each component may be satisfied without the reinforcing material. The above Table 2 is a comparison table of the existing structure and the inventive structure of the front side member 101 and the rear lower member 103. Referring to the contents of the above Table, five reinforcing materials may be omitted only in the front side member 101 and the rear lower member 103 and a total weight reduction effect of about 3.1 kg is shown.

The reinforcing material may be omitted even in the center upper member and the side sill of the underbody structure for a vehicle, and the total weight reduction effect may be increased, the number of components required for assembly may be reduced, and the assembling process may be simplified. As described above, according to the underbody structure for a vehicle according to the exemplary embodiments, the weight of the underbody structure for a vehicle may be reduced by removing the reinforcing components by being manufactured to have different thicknesses for each section to distribute the strength to be suited for purposes for each section.

While this invention has been described in connection with what is presently considered to be exemplary embodiments, it is intended to cover various modifications and equivalent arrangements without departing from the spirit and scope of the present invention as defined by the following claims. In addition, it is to be considered that all of these modifications and alterations fall within the scope of the present invention.

What is claimed is:

1. An underbody structure for a vehicle, comprising:
    a front side member, wherein the front side member includes:
        a cooling module section being a foremost portion that corresponds to a position of a cooling module in front of the vehicle;
        a front absorption section that extends toward a rear of the cooling module section;
        a power train section that extends toward a rear of the front absorption section corresponds to where an engine and a transmission are positioned; and
        a subframe mounting section that extends toward a rear of the power train section and corresponds to a subframe position,
    wherein the thickness for each section are manufactured differently for each section by a tailor rolled blanks method.

2. The underbody structure for a vehicle of claim 1, further comprising:
    a rear lower member connected to a rear end of the front side member, wherein the rear lower member includes:
        a subframe mounting section that corresponds to the position of the subframe;
        a pedal mounting section that extends within the subframe mounting section and corresponds to a position of a pedal;
        a rear preservation section that extends toward a rear of the pedal mounting section; and
        a sheet mounting section that extends toward a rear of the rear preservation section and corresponds to a position of a front seat sheet.

3. The underbody structure for a vehicle of claim 1, further comprising:
    a center upper member, wherein the center upper member includes:
        a pedal mounting section that corresponds to a position of a pedal;
        a rear preservation section that extends toward a rear of the pedal mounting section; and
        a sheet mounting section that extends toward a rear of the rear preservation section and corresponds to a position of a front seat sheet.

4. The underbody structure for a vehicle of claim 1, further comprising:
    a side sill, wherein the side sill includes:
        a rear preservation section that extends toward a rear of the pedal mounting section; and
        a sheet mounting section that extends toward a rear of the rear preservation section and corresponds to a position of a front seat sheet.

5. The underbody structure for a vehicle of claim 1, wherein when the thickness of the cooling module section is a first thickness, the thickness of the front absorption section is a second thickness, the thickness of the power train section is a third thickness, and the thickness of the subframe mounting section is a fourth thickness, wherein the third thickness is greater than the second thickness, the second thickness is greater than the first thickness, and the first thickness is greater than the fourth thickness.

6. The underbody structure for a vehicle of claim 2, wherein when the thickness of the subframe mounting section is a fourth thickness, the thickness of the pedal mounting section is a fifth thickness, the thickness of the rear reservation section is a sixth thickness, and the thickness of the sheet mounting section is a seventh thickness, wherein the fifth thickness is greater than the fourth thickness, the fourth thickness is greater than the sixth thickness, and the sixth thickness is greater than the seventh thickness.

7. The underbody structure for a vehicle of claim 3, wherein when the thickness of the pedal mounting section is a fifth thickness, the thickness of the rear reservation section is a sixth thickness, and the thickness of the sheet mounting section is a seventh thickness, wherein the fifth thickness is greater than the sixth thickness and the sixth thickness is greater than the seventh thickness.

8. The underbody structure for a vehicle of claim 4, wherein when the thickness of the rear preservation section is a sixth thickness and the thickness of the sheet mounting section is a seventh thickness, wherein the sixth thickness is greater than the seventh thickness.

\* \* \* \* \*